FIG. 2

INVENTOR
ADOLF R. GRAD
BY
Wesley P. Merrill
ATTORNEY

Sept. 3, 1957 A. R. GRAD 2,804,828
AXIAL TYPE HYDRODYNAMIC MACHINE
Filed Oct. 26, 1953 9 Sheets-Sheet 5

INVENTOR
ADOLF R. GRAD
BY
Wesley P. Merrill
ATTORNEY

Sept. 3, 1957 A. R. GRAD 2,804,828
AXIAL TYPE HYDRODYNAMIC MACHINE
Filed Oct. 26, 1953 9 Sheets-Sheet 7

FIG. 10

INVENTOR
ADOLF R. GRAD
BY
Wesley P. Merrill
ATTORNEY

INVENTOR
ADOLF R. GRAD
BY Wesley P. Merrill
ATTORNEY

Sept. 3, 1957 A. R. GRAD 2,804,828
AXIAL TYPE HYDRODYNAMIC MACHINE
Filed Oct. 26, 1953 9 Sheets-Sheet 9

INVENTOR
ADOLF R. GRAD
BY
ATTORNEY

United States Patent Office 2,804,828
Patented Sept. 3, 1957

2,804,828

AXIAL TYPE HYDRODYNAMIC MACHINE

Adolf R. Grad, Milwaukee, Wis., assignor to The Oilgear Company, Milwaukee, Wis., a corporation of Wisconsin Application October 26, 1953, Serial No. 388,163

15 Claims. (Cl. 103—162)

This invention relates to hydrodynamic machines of the type in which the pistons and cylinders are arranged axially and it relates in particular to pumps and motors of the swash plate type.

Such machines will function as pumps when driven mechanically and will function as motors when supplied with motive liquid. Since the function of a pump is substantially opposite to the function of a motor, the invention will be explained as being embodied in a pump in order to simplify the description but it is to be understood that the invention is equally applicable to motors and that referring to the machine as a pump in no way limits the invention to pumps.

The present invention has as an object to provide an axial type pump which can create very high pressures and can be made in very large sizes.

Another object is to provide an axial type pump having a novel hydraulic thrust bearing through which the reactions to the pumping forces are transmitted to a member which is restrained from axial movement.

Another object is to provide an axial type pump having a universal joint which extends around the piston reciprocating mechanism radially outward therefrom.

Other objects and advantages will appear from the following description of the pump shown in the accompanying drawings in which the views are as follows.

The pump has been shown as having its mechanism arranged within a casing 1 which is closed at its left end by a removable end head 2 and at its right end by a distributor block 3 through which liquid flows to and from an external circuit. Block 3 has a drive shaft 4 extending therethrough and rotatably supported therein as by means of two bearings 5 and 6. Shaft 4 extends outward beyond block 3 for connection to a source of power and its inner portion supports a cylinder barrel 7 which has a bore 8 extending therethrough to receive shaft 4. Cylinder barrel 7 is fixed for rotation with shaft 4, as by means of a key 9, and it is restrained from movement axially of shaft 4 by means to be presently described.

Cylinder barrel 7 has a plurality of cylinders 14 formed therein and equally spaced in a circular row which is concentric with shaft 4. Each cylinder 14 has an elongated port 15 (Figs. 1 and 4) extending from its inner end through the right end of cylinder barrel 7 and a piston 16 is fitted in each cylinder 14 and provided with a piston rod 17 by means of which piston 16 is reciprocated to cause liquid to flow into and out of the cylinder through its port 15.

Figures 4, 5:
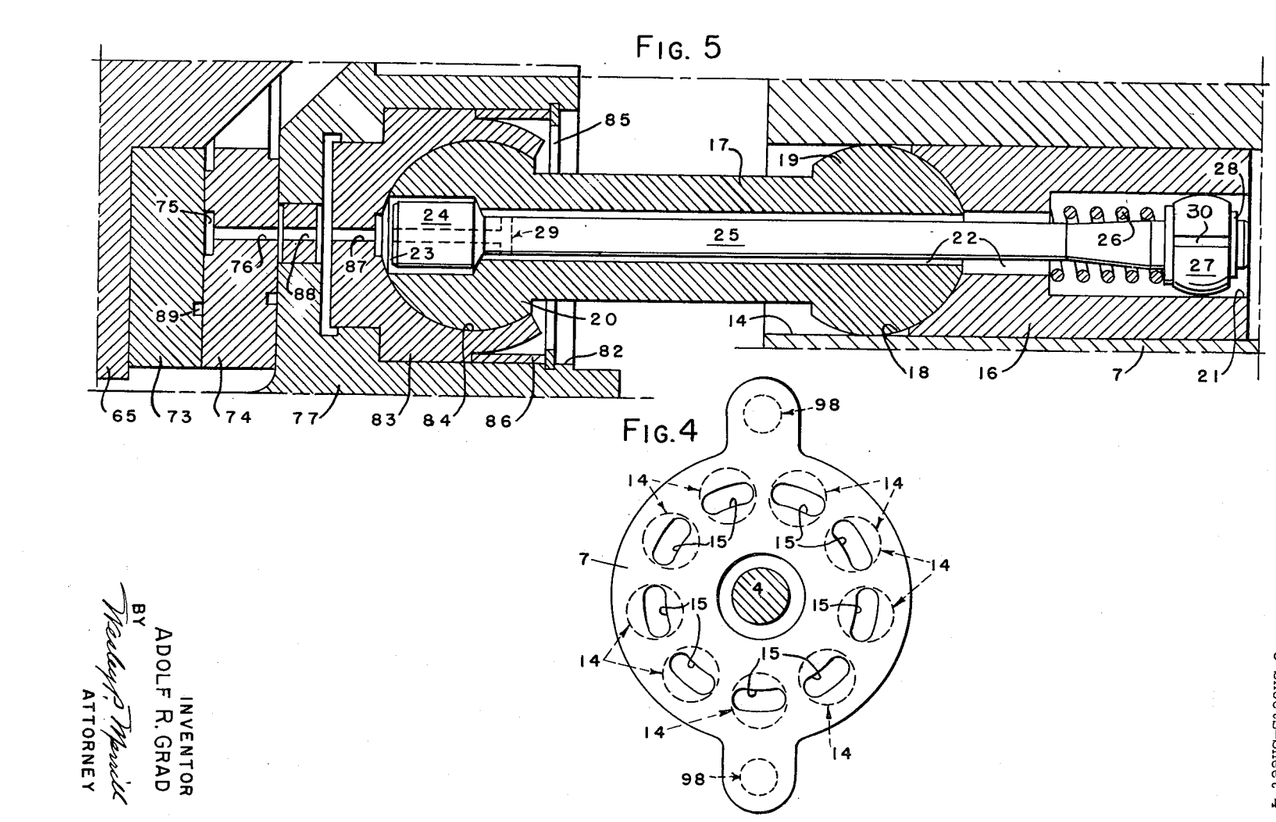
Fig. 4 is an end view of the cylinder barrel which contains the pumping pistons and cylinders, the view being taken in the plane indicated by the line 4—4 of Fig. 1.
Fig. 5 is an enlarged longitudinal section through the piston and piston rod assembly shown in Fig. 1.

The piston and piston rod assembly 16—17 is substantially the same as one of the piston and piston rod assemblies described and claimed in Patent No. 2,752,214. As shown in Fig. 5, each piston 16 has formed in its left end a spherical seat 18 which is complementary to and engaged by a spherical head 19 forming one end of piston rod 17 the other end of which is formed into a spherical head 20 which is connected to the mechanism for reciprocating the pistons as will presently be explained.

Head 19 is nearly as large in diameter as cylinder 14 to provide between it and piston 16 bearing surfaces which are of maximum area to thereby permit very high pumping forces to be transmitted therethrough and thereby enable piston 16 to create very high pressures in cylinder 14. Piston 16 has a spring chamber 21 extending into it from its inner end and communicating with a bore 22 which is formed in piston 16 and in rod 17. The other end of bore 22 terminates in a counterbore 23 formed in head 20 and extending inward from the left end thereof to receive the enlarged head 24 of an elongated bolt 25 which extends through bore 22 and into chamber 21. Head 24 bears against the shoulder formed at the junction of bore 22 and counterbore 23.

Piston 16 and rod 17 are firmly but yieldingly held in contact with each other by a spring 26 arranged between the end wall of chamber 21 and an abutment 27 fixed upon bolt 25 as by means of a snap ring 28. Abutment 27 is slidably fitted in chamber 21 to keep the end of bolt 25 centered against the effect of centrifugal forces.

In order to provide liquid for lubricating head 20 and for other purposes, a duct 29 extends axially into bolt 25 from the end of head 24 and then extends radially outward into communication with bore 22, and abutment 27 is provided with one or more grooves 30 through which liquid can flow from cylinder 14 into chamber 21 and then flow through bore 22 and duct 29 into counterbore 23 so that the pressure in counterbore 23 is always the same as the pressure in cylinder 14.

The flow of liquid into and out of the several cylinders 14 is controlled by an annular flat valve 33 which engages the end of cylinder barrel 7 and extends around shaft 4. The contacting surfaces are made flat and smooth to provide a substantially liquid tight joint between valve 33 and cylinder barrel 7. Rotation of valve 33 is prevented such as by means of a pin 34 which extends through valve 33 and into block 3.

Valve 33 has two arcuate ports 35 and 36 (Fig. 6) formed in the face thereof upon the same radius as cylinder ports 15 each of which registers with ports 35 and 36 alternately as cylinder barrel 7 rotates. The adjacent ends of ports 35 and 36 are spaced apart a distance equal to or slightly greater than the length of a cylinder port 15. The portions of the valve face between the ends of ports 35 and 36 constitute seals or bridges 37 and 38 which prevent a cylinder port 15 from establishing communication between the two valve ports as the cylinder port moves from one valve port to the other.

Figures 6, 7, 8:
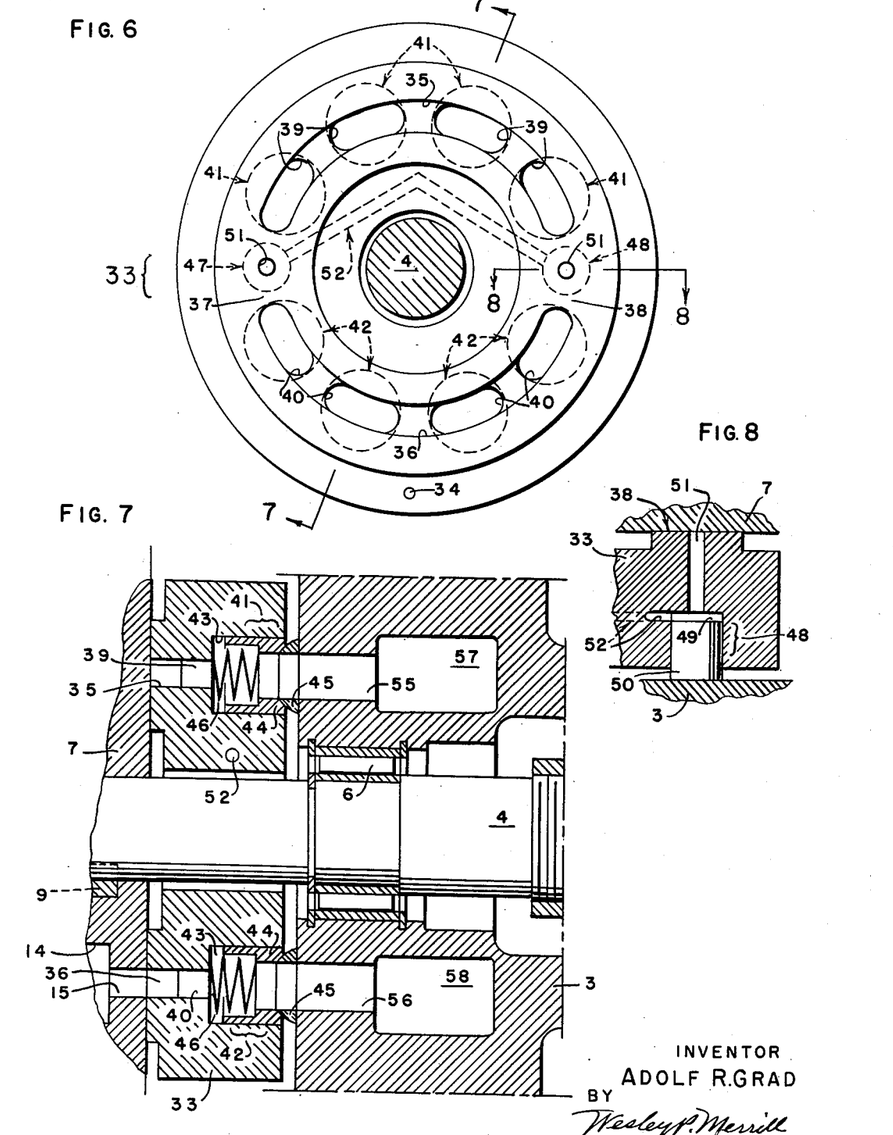
Fig. 6 is a face view of the valve which controls the flow of liquid to and from the pumping cylinders, the view being taken in the plane indicated by the line 6—6 of Fig. 1 but drawn to a larger scale.
Fig. 7 is a sectional view taken through the valve and portions of the adjacent parts to illustrate two of the hold-up motors which hold the valve against the end of the cylinder barrel, the view being taken on the line 7—7 of Fig. 6.
Fig. 8 is a sectional view taken on the line 8—8 of Fig. 6 and showing one of the balancing motors which assist the hold-up motor in holding the valve against the end of the cylinder barrel.

Valve port 35 communicates with a plurality of oblong holes 39, four being shown, and valve port 36 communicates with an equal number of oblong holes 40. Each hole 39 communicates with a hold-up motor 41 and each hole 40 communicates with a hold-up motor 42 all of which are arranged within valve 33.

The hold-up motors are all alike and, as shown in Fig. 7, each includes a cylinder 43 which is formed in valve 33, a tubular piston 44 which is fitted in cylinder 43, a sealing member 45 which is arranged between piston 44 and block 3, and a spring 46 arranged between piston 44 and the end wall of cylinder 43 to initially urge valve 33 against cylinder barrel 7, piston 44 against member 45 and member 45 against block 3. The contacting surfaces of member 45 and block 3 are made flat and smooth and the contacting surfaces of member 45 and piston 44 are made spherical and smooth to provide substantially liquid tight joints therebetween while permitting valve 33 to adjust itself to the end of cylinder barrel 7.

Whenever the pump is creating pressure, valve 33 is urged away from the end of cylinder barrel 7 by a blow-off force which is created by the pressure in the cylinder ports communicating with the high pressure valve port 35 or 36 and by the pressure in the film of liquid between the face of valve 33 and the end of cylinder barrel 7. But the pressure in the high pressure valve port 35 or 36 extends into the hold-up motors 41 or 42 in communication therewith and enables those motors to urge valve 33 toward cylinder barrel 7 with a force proportional to the pressure. However, power pumps usually have an odd number of cylinders for well known reasons and the number of cylinders containing liquid under pressure will change between an even number and an odd number each time a cylinder port opens to a valve port which causes the blow-off force to vary intermittently.

In order to compensate for the variations in the blow-off force, at least one balancing motor is arranged behind each of the bridges and is energized and de-energized each time a valve port crosses that bridge. As shown in Fig. 6, two balancing motors 47 and 48 are arranged behind bridges 37 and 38 respectively. The two balancing motors are alike and each includes a cylinder 49 (Fig. 8), which is formed in valve 33, and a piston 50 which is fitted in cylinder 49 and bears against block 3. A hole 51 extends from each cylinder 49 through the face of the valve. The two cylinders 49 are usually connected to each other by a channel 52 formed in valve 33. The arrangement is such that the balancing motors are alternately energized and de-energized in response to the valve ports passing across the bridges and vary the total hold-up force in accordance with the variations in the blow-off force. The resultant of the pumping forces also varies both in magnitude and location each time a cylinder port crosses a bridge but the resultant of the hold-up forces exerted by hold-up motors 41 or 42 and by balancing motors 47 and 48 varies correspondingly both in magnitude and location and thereby prevents shaft 4 from being subjected to bending stresses.

Figure 9:
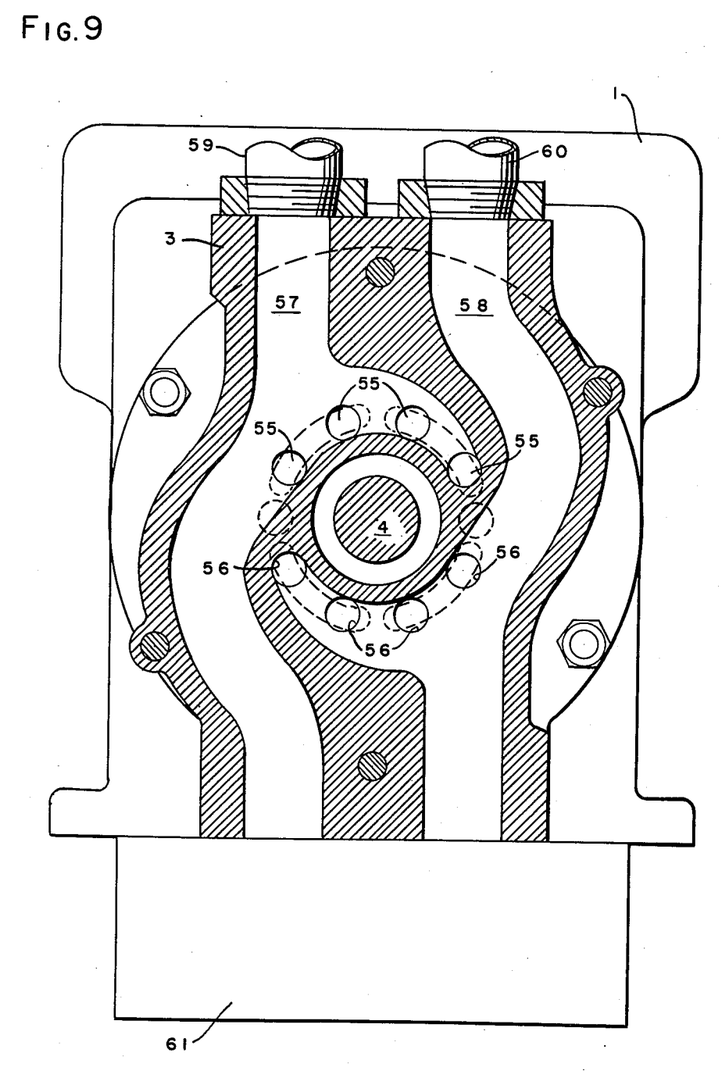
Fig. 9 is a transverse vertical section taken on the line 9—9 of Fig. 1 and illustrating the passages for connecting the pump to an external circuit.

The several hold-up motors 41 and 42 (Figs. 6 and 7) communicate, respectively, with an equal number of holes 55 and 56 (Figs. 7 and 9) which are formed in distributing block 3 and communicate, respectively, with two passages 57 and 58 formed therein. As shown in Fig. 9, the upper ends of passages 57 and 58 are adapted to be connected to opposite sides of an external circuit such as by means of pipes 59 and 60 respectively. The lower ends of passages 57 and 58 are connected to an automatic valve 61 which is bolted to the bottom of block 3 and is arranged within the reservoir (not shown) upon which the pump is mounted. Since such valves are well known and in extensive use, valve 61 has not been shown in detail. It is deemed sufficient to state that valve 61 automatically blocks the end of the passage 57 or 58 containing liquid under pressure and connects the other passage to the reservoir through a low pressure resistance valve and a check valve so that liquid returned to the pump from the circuit in excess of pump requirements may be discharged through the resistance valve in the reservoir and, if the pump is not supercharged, it may draw liquid from the reservoir through the check valve to make up any deficiency in the liquid returned from the circuit.

When cylinder barrel 7 is rotated and the pump is adjusted to cause the pistons 16 above the center of shaft 4 to move inward and the pistons 16 below the center of shaft 4 to move outward, the inward moving pistons will eject liquid from their cylinders through cylinder ports 15, valve port 35, holes 39, hold-up motors 41, holes 55 and passage 57 into pipe 59, and the cylinders containing outward moving pistons will be supplied with liquid through their ports 15, valve port 36, holes 40, hold-up motors 42, holes 56, and passage 58 from pipe 60 and/or from the reservoir through valve 61. When the pump is adjusted to cause the pistons 16 below the center of shaft 4 to move inward and the pistons above the center of shaft 4 to move outward, the flow of liquid will be reversed.

Figure 1:
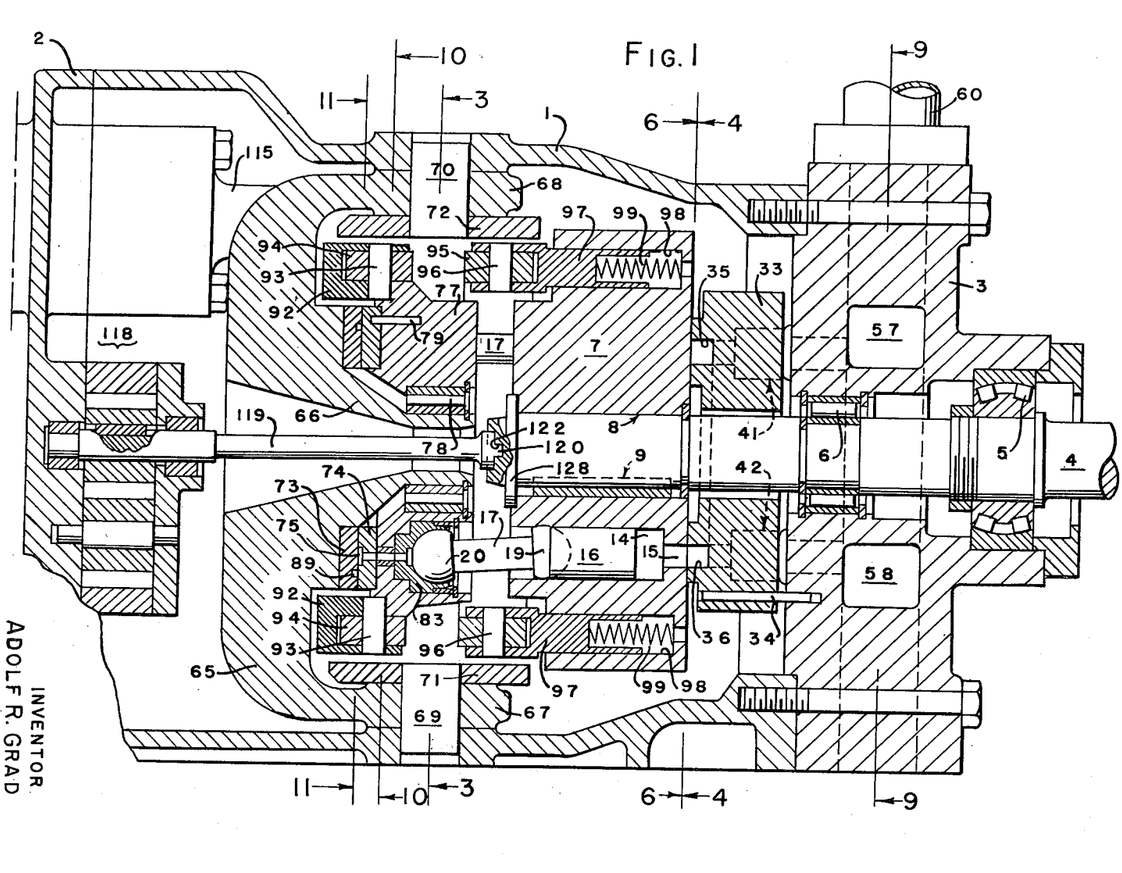
Fig. 1 is a central vertical section through a pump in which the invention is embodied, the view being taken on the line 1—1 of Fig. 3.
Figure 2:
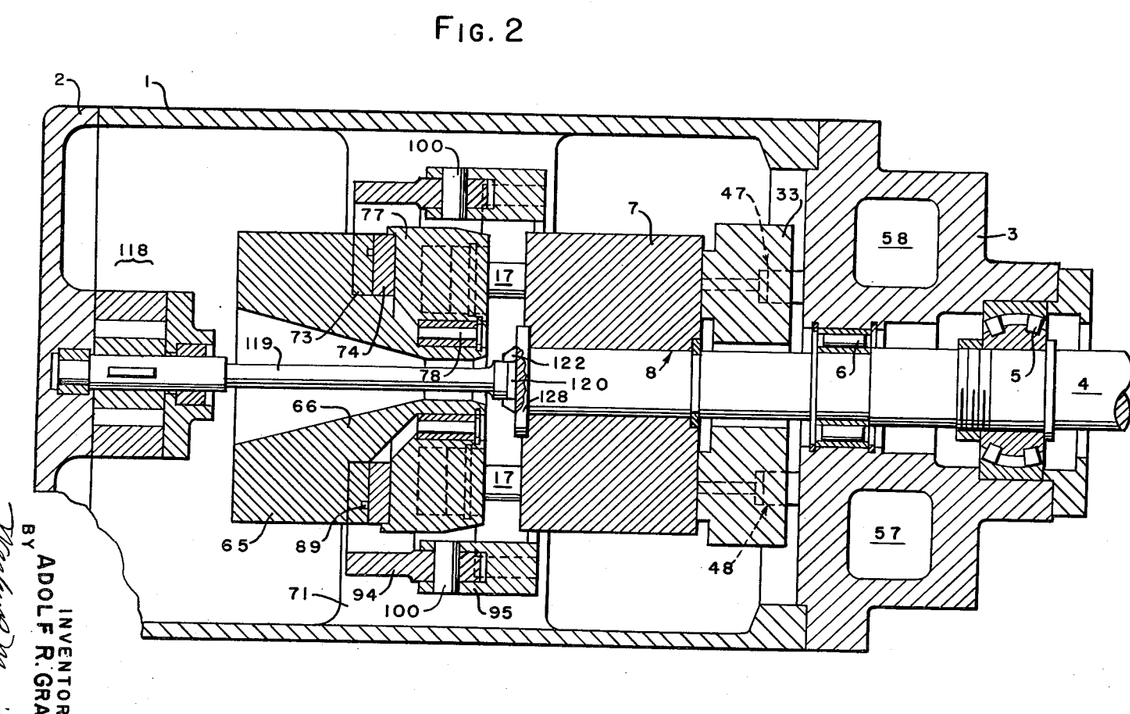
Fig. 2 is a longitudinal sectional plan view taken through the pump on the irregular line 2—2 of Fig. 3.
Figure 3:
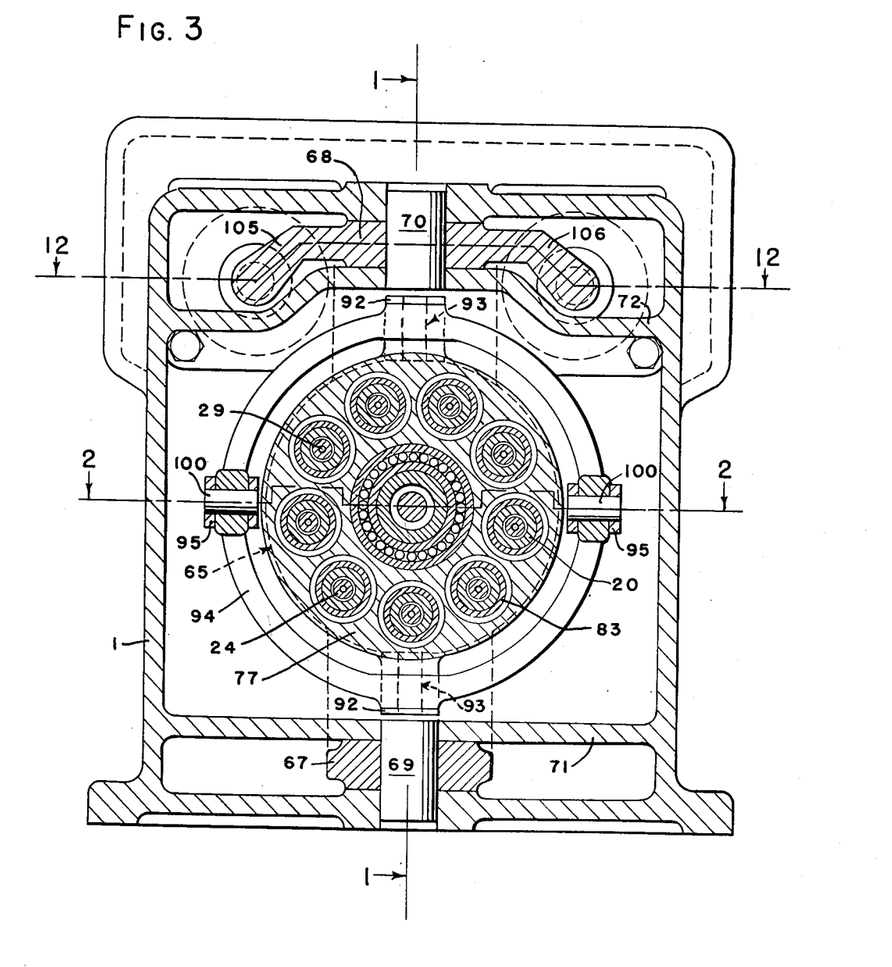
Fig. 3 is a transverse vertical section taken on the line 3—3 of Fig. 1.

Pistons 16 are reciprocated by motion transmitted thereto from a cam device when cylinder barrel 7 is rotated and the cam device is inclined to the cylinder barrel axis. As shown in Figs. 1–3, the cam device includes a reaction member or cradle 65 having an integral central horn 66 and two integral arms 67 and 68 which are arranged diametrically opposite each other and are pivotally supported by two trunnions 69 and 70 respectively. Trunnion 69 is carried by the lower wall of casing 1 and by a web 71 which is formed integral with casing 1. Trunnion 70 is carried by the upper wall of casing 1 and by a web 72 which is formed integral with casing 1. Trunnions 69 and 70 are ordinarily provided with anti-friction bearings which have been omitted from the drawings in order to simplify the views.

Figure 11:
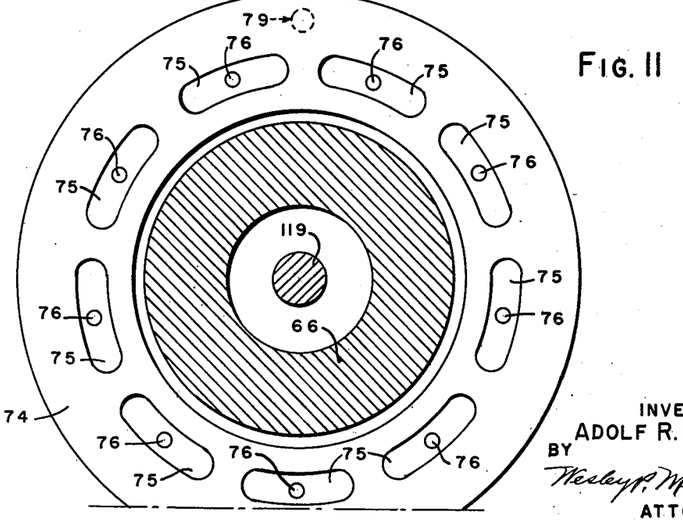
Fig. 11 is a face view of a hydraulic thrust bearing, the view being taken in the plane indicated by the line 11—11 of Fig. 1 but drawn to the same scale as Fig. 10.

Cradle 65 also includes a flat annular wear plate 73 which extends around the base of horn 66 and is engaged by an annular thrust bearing 74 having formed in the face thereof in contact with plate 73 as many elongated recesses or pressure chambers 75 as there are cylinders 14. As shown in Fig. 11, chambers 75 are equally spaced in a circular row and a hole 76 extends through bearing 74 at the center of each chamber 75.

As shown in Fig. 1, the cam device also includes a thrust member or swash plate 77 which is fixed for rotation with cylinder barrel 7 by a universal joint as will presently be explained. Swash plate 77 has a flat face in contact with thrust bearing 74 and it is journaled upon a bearing 78 carried by the horn 66 on cradle 65. Due to the small size of the drawing, bearings 78 and 6 have been shown as having plain rollers but the bearings actually used are a commercial type in which each roller has a guide groove formed in its peripheral surface and each race has a guide rib extending into the grooves in the rollers. Thrust bearing 74 is fixed for rotation with swash plate 77 as by means of a pin 79.

Swash plate 77 has formed therein as many pockets 82 (Fig. 5) as there are cylinders 14. Pockets 82 are equally spaced in a circular row having the same radius as the row of holes 76 in thrust bearing 74. As shown in Fig. 5, each pocket 82 has closely fitted therein a socket 83 having an internal spherical bearing surface 84 complementary to and fitted upon the head 20 of a piston rod 17. Socket 83 is retained in pocket 82 in any suitable manner such as by means of a snap ring 85, which is fitted in a suitable groove formed in the wall of pocket 82, and a retainer ring 86 which has one end in contact with snap ring 85 and its other end in contact with a shoulder formed upon socket 83.

Socket 83 is provided with a central hole 87 which extends from the interior of the socket through the left end thereof and communicates with a hole 88 which extends through swash plate 77 and communicates with one of the holes 76 in thrust bearing 74. The arrangement is such that the pressure in the counterbore 23 in the head 20 of rod 17, which is always the same as the pressure in the corresponding cylinder 14 as previously explained, will extend through holes 87, 88 and 76 into the corresponding pressure chamber 75 in the thrust bearing 74.

Liquid will seep from chamber 75 and form a lubricating film between the contacting surfaces of thrust bearing 74 and wear plate 73, and any pressure in chamber 75 will extend into the lubricating film. In order to limit the area of the film into which pressure can extend, an annular drain groove 89 is formed either in wear plate 73 or in thrust member 74.

When the pump is functioning, the pressures in the several cylinders 14 will act upon the ends of pistons 16 and urge the pistons and piston rod assemblies, the swash plate and thrust bearing toward cradle 65. But the pressure in each cylinder 14 extends into the pressure chamber 75 in the same radial plane and into the film surrounding that chamber, as explained above, and causes the liquid in that chamber and in the surrounding film to exert a force in opposition to the force exerted upon the piston by the liquid in the cylinder.

The pressure in each chamber 75 will be the same as the pressure in the cylinder 14 in the same radial plane. The pressure in the film radially inward and outward from that chamber will be the same as the cylinder pressure at the edges of that chamber and will gradually drop to zero at the adjacent edge of drain groove 89 and at the outer edge of the contact face of bearing 74. The pressure in the film at each end of that chamber 75 will be the same as the cylinder pressure to a point half way between that chamber and the adjacent chamber 75 regardless of the pressures in the adjacent chambers.

The force exerted upon each piston 16 by the pressure in its cylinder is thus counterbalanced by the force exerted upon the balancing area which is arranged in the same radial plane as that cylinder and extends radially from drain groove 89 to the outer edge of the contact surface of thrust member 74 and extends circumferentially an angular distance equal to the angular distance between adjacent cylinders 14. The balancing area may be so proportioned that the force exerted thereon by the liquid in the pressure chamber and in the lubricating film is exactly equal to the force exerted upon the piston by the liquid in the cylinder 14 in the same radial plane but preferably the balancing area is so proportioned that the force acting thereon is slightly less than the force acting upon the piston so that the thrust bearing is positively held in contact with the wear plate by the small preponderance of force acting upon the piston.

When the pump is performing useful work, each cylinder 14 will communicate with the high pressure port in valve 33 during one-half of each revolution of cylinder barrel 7 and will communicate with the low pressure port in valve 33 during the other half of each revolution of cylinder barrel 7. The instant that a cylinder opens to the high pressure port, the pressure therein will act upon the end of the piston in that cylinder and also act upon the balancing area for that piston. The instant that a cylinder opens to the low pressure port, the pressure acting upon the piston in that cylinder and upon the balancing area for that piston will drop to the pressure in the low pressure port. Thrust bearing 74 thus functions as a commutator to automatically effect hydrostatic balance of the swash plate and the piston and piston rod assemblies and it eliminates the need for a mechanical axial thrust bearing which is necessary in the prior pumps.

Rotation is transmitted to swash plate 77 from cylinder barrel 7 through a universal joint which is radially outward from the connections between the swash plate and the piston rods instead of being radially inward therefrom as in the prior pumps of the same general type.

Figure 10:
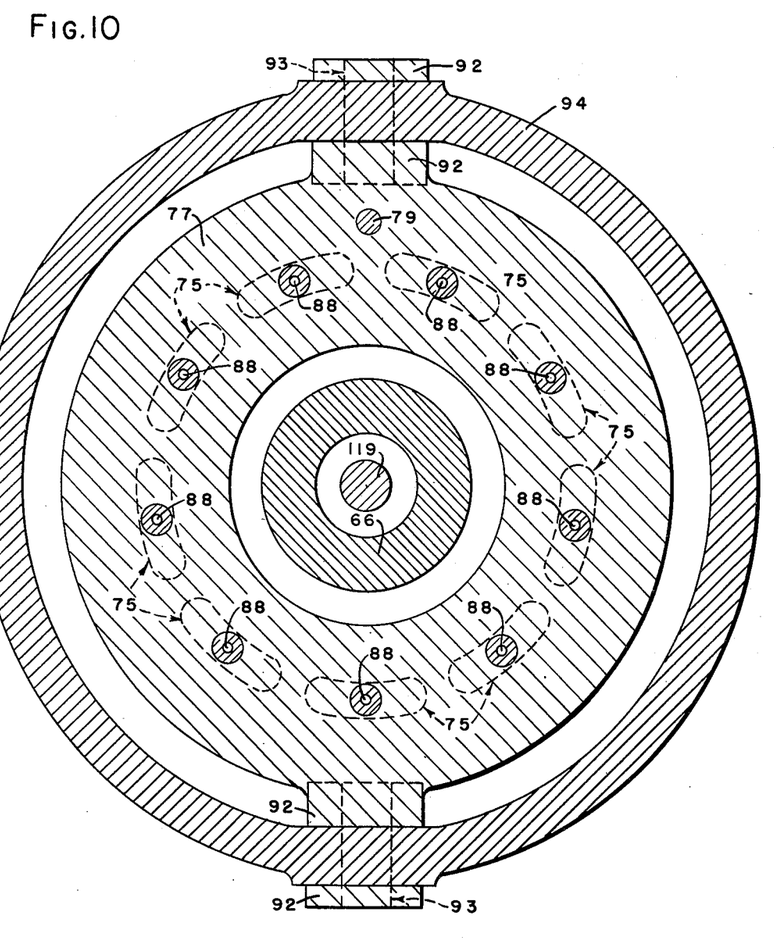
Fig. 10 is a sectional view taken through the swash plate and one ring of the universal joint which transmits rotary motion from the cylinder barrel to the swash plate, the view being taken in the plane indicated by the line 10—10 of Fig. 1 but drawn to a larger scale.

As shown in Figs. 1, 3 and 10, swash plate 77 has two U-shaped arms 92 formed integral with its outer peripheral portion at diametrically opposed points and connected by two pins 93 to a ring 94 at diametrically opposite points. A second ring 95 is connected to cylinder barrel 7 in the same radial plane in which ring 94 is connected to swash plate 77. As shown in Fig. 1, ring 95 is connected at diametrically opposite points by two pins 96 to the bifurcated outer ends of two plungers 97 which are slidable in bores 98 formed in cylinder barrel 7. Plungers 97 are urged outward by light springs 99. As shown in Figs. 2 and 3, rings 94 and 95 are pivotally connected to each other by two pins 100 which are spaced 90° from pins 93 and 96 and are arranged in the same transverse plane as trunnions 69 and 70.

The arrangement is such that cylinder barrel 7 when rotated will rotate ring 95 through plungers 97 and pins 96, ring 95 will rotate ring 94 through pins 100, ring 94 will rotate swash plate 77 through pins 93 and swash plate 77 will rotate thrust bearing 74 through pin 79. If cradle 65 and swash plate 77 are inclined to the axis of cylinder barrel 7, ring 95 will pivot upon pins 96 and ring 94 will pivot upon pins 93 and 100 to compensate for the angle between the axes of rotation of cylinder barrel 7 and swash plate 77.

In swash plate type pumps, the trunnion axis must pass through the transverse axis of the universal joint and through the center of the plane in which the ball and socket joints on the swash plate rotate. By arranging the universal joint outside the annular row of ball and socket joints on the swash plate, radial thrust bearing 78 may be mounted with its transverse centerline on the trunnion axis so that the resultant of the radial components of the pumping forces lands upon the center of the thrust bearing, thereby permitting the use of a radial thrust bearing which is made smaller and lighter than the radial thrust bearings that are required in the prior pumps because in the prior pumps the universal joint is inside the ball and socket joints on the swash plate so that the radial thrust bearing must be offset a substantial distance from the plane of the radial components of the pumping forces.

The pump has been shown with thrust members 65—77 in its neutral position, that is, with swash plate 77 normal to the axis of cylinder barrel 7 in which position of the thrust member pump displacement is zero. When the pump is driven and the thrust member is tilted in one direction from its neutral position, the pump will discharge liquid through passage 57 and will be supplied with liquid through passage 58. When the thrust member is tilted in the opposite direction from its neutral position, the flow of liquid will be reversed.

Figure 12:
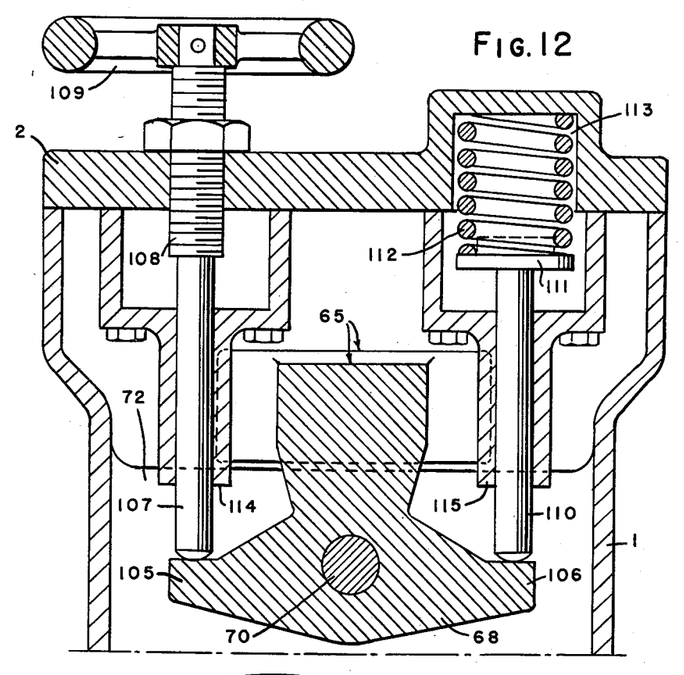
Fig. 12 is a sectional view illustrating a simple mechanism for varying the displacement of the pump, the plane of the view being indicated by the irregular line 12—12 of Fig. 3.

The thrust member may be tilted by power means or by manual means in any suitable manner. As shown in Figs. 3 and 12, arm 68 of cradle 65 has two integral extensions 105 and 106 on opposite sides thereof. Extension 105 is engaged by a push rod 107 formed integral with a screw 108 which is threaded through end head 2 and is provided on its outer end with a handwheel 109. Extension 106 is engaged by one end of a push rod 110 having a spring retainer 111 fixed on its other end and engaged by a spring 112 which is arranged in a recess 113 formed in end head 2. Push rods 107 and 110 are slidable, respectively, in two guides 114 and 115 which are bolted to end head 2.

When handwheel 109 is rotated in a direction to cause screw 108 to advance push rod 107, cradle 65 will be swung upon trunnions 69 and 70 in one direction and push rod 110 will compress spring 112. When handwheel 109 is rotated in a direction to cause screw 108 to retract push rod 107, spring 112 will cause push rod 110 to swing cradle 65 upon trunnions 69 and 70 in the opposite direction.

The displacement of the pump may be varied in any other well known manner such as by rotating screw 108 with an electric motor which is controlled by a switch arranged at a remote point or by shifting push rods 107 and 110 with hydraulic servo motors which are energized with liquid from a source other than the pump and are controlled by suitable valve means.

In order to provide liquid for control and/or other purposes, the pump may be provided with an auxiliary pump which is driven in unison with cylinder barrel 7. As shown, a gear pump 118 is attached to end head 2 and is driven by a shaft 119 which extends through horn 66 and is connected to drive shaft 4. Shaft 119 has been shown as having its right end enlarged in diameter and provided with a transverse tongue 120, and shaft 4 has been shown as having a circular recess 121 (Fig. 13) formed in its end to receive the enlarged end of shaft 119 and a slot 122 to receive tongue 120.

Figure 13:
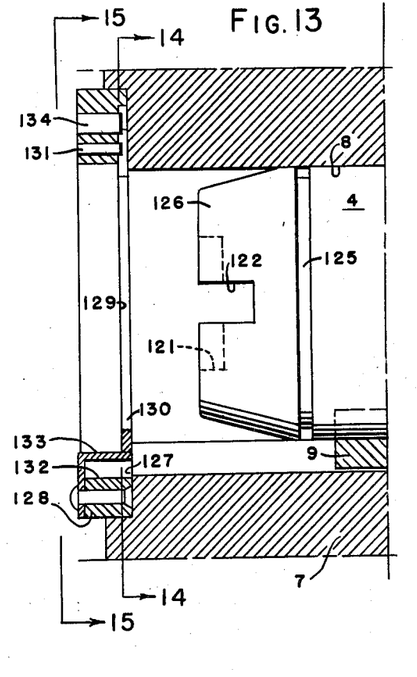
Fig. 13 is a partial sectional view illustrating a means for restraining the cylinder barrel from axial movement relatively to the drive shaft, the view being taken in the same plane as Fig. 1 but drawn to a much larger scale and showing the end portion of the drive shaft in the position occupied just before it is attached to the cylinder barrel.

It has previously been mentioned that cylinder barrel 7 is restrained from movement axially of shaft 4. As shown in Fig. 13, drive shaft 4 has a peripheral groove 125 formed therein and spaced from the left end thereof to receive a snap ring, and the end portion 126 of shaft 4 is made conical so that it may be forced through the snap ring which is restrained from movement axially of cylinder barrel 7.

Figure 14:
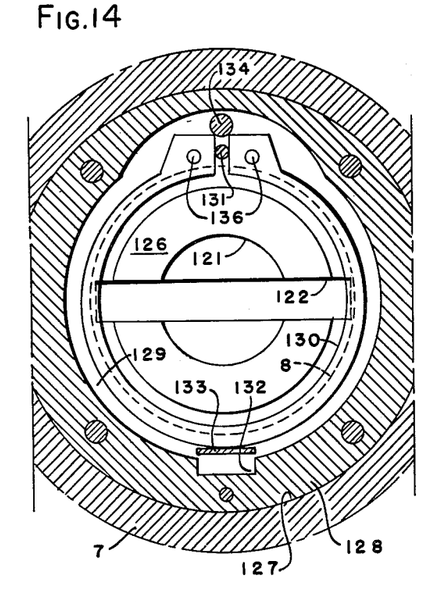
Fig. 14 is a transverse section taken on the line 14—14 of Fig. 13.
Figure 15:
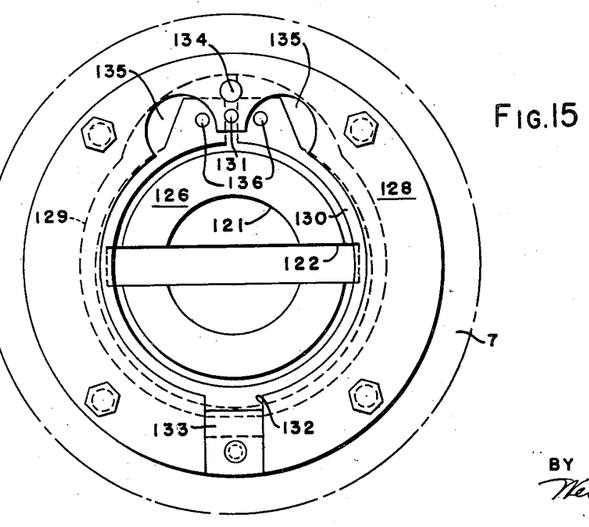
Fig. 15 is an end view taken on the line 15—15 of Fig. 13.

As shown in Figs. 13-15, cylinder barrel 7 has formed in the left end thereof an annular groove 127 which is concentric with and considerably larger than bore 8. Groove 127 has extending into it a keeper ring 128 which is bolted to cylinder barrel 7. Ring 128 has formed in its inner face a recess 129 to receive a snap ring 130 which is restrained from axial movement by the walls of groove 127 and recess 129. Rotation of snap ring 130 relatively to cylinder barrel 7 is prevented by a pin 131 which is fixed in keeper ring 128 and has the inner end portion thereof arranged between the ends of snap ring 130.

Keeper ring 128 has formed in its internal peripheral surface diametrically opposite pin 131 a notch 132 to receive one leg of a weak leaf spring 133 which is bent into a right angle and has its other leg fastened to the outer face of ring 128. Spring 133 engages snap ring 130 and urges its ends against the inner portion of a pin 134 which is fixed in keeper ring 128 radially outward from pin 131 and has its inner portion in recess 129. Pin 134 and spring 133 are so located that they hold the inner peripheral surface of snap ring 130 concentric with bore 8 in cylinder barrel 7.

When assembling the pump, the parts between and including cylinder barrel 7 and cradle 65 are arranged in position within casing 1. The distributor block 3, shaft 4 and valve 33 are assembled as a unit, shaft 4 is inserted into bore 8 in cylinder barrel 7 and distributor block 3 moved toward casing 1. As shaft 4 approaches its final position, snap ring 130 will first be expanded by conical portion 126 of shaft 4 and will then snap into groove 125 and fix cylinder barrel 7 to shaft 4 at which time block 3 will be in engagement with and may be bolted to casing 1.

The pump may be disassembled by unbolting block 3 and pulling it and shaft 4 outward. Cylinder barrel 7 and valve 33 will move with shaft 4 and the piston and piston rod assemblies will remain attached to swash plate 77. In order that cylinder barrel 7 may be readily removed from shaft 4, keeper ring 128 has two recesses 135 (Fig. 15) extending into it from its outer face to expose two holes 136 which are provided in snap ring 130 adjacent the ends thereof according to common practice. By inserting the ends of a pair of snap ring pliers into holes 136, snap ring 130 may be expanded and moved radially against the resistance of light spring 133 until it is clear of groove 125 and then cylinder barrel 7 may be removed from shaft 4.

The pump illustrated and described herein may be modified in various ways without departing from the scope of the invention which is hereby claimed as follows.

I claim:

1. An axial pump, comprising a casing, a rotatable cylinder member arranged within said casing and having a plurality of pistons and cylinders arranged therein parallel to each other and in a circular row, a non-rotatable reaction member arranged within and restrained from axial movement by said casing, a rotatable thrust member engaging and restrained from axial movement by said reaction member, the axes of said cylinder member and said thrust member being inclined to each other when the pump is functioning, means including a piston rod connecting each of said pistons to said thrust member, means for rotating said cylinder member and said thrust member substantially in synchronism to effect reciprocation of said pistons, valve means engaging said cylinder member for controlling the flow of liquid to and from said cylinders, a hydraulic thrust bearing rotatable with said thrust member and arranged between said thrust member and said reaction member in contact therewith, said bearing having in the face thereof in contact with said reaction member a plurality of pressure chambers each of which is arranged in the same radial plane as one of said cylinders, channel means connecting each of said chambers to the cylinder in the same radial plane to permit liquid to flow from said cylinders into said recesses and to maintain in each recess the same pressure that prevails in the cylinder in the same radial plane to thereby cause liquid to seep from said recesses and form a lubricating film between said bearing and said reaction member, and means arranged between said bearing and said reaction member for limiting the area of lubricating film into which pressure can extend from said recesses to such an area that the force exerted by the liquid in each recess and in the film surrounding that recess and extending through an angular distance equal to the angular distance between adjacent recesses is nearly equal to but less than the force exerted by the liquid in the cylinder in the same radial plane upon the piston in that cylinder.

2. An axial pump, comprising a casing, a rotatable cylinder member arranged within said casing and having a plurality of pistons and cylinders arranged therein parallel to each other and in a circular row, means for rotating said cylinder member, a non-rotatable reaction member restrained from axial movement by said casing and inclined to the axis of said cylinder member, a rotatable thrust member engaging and restrained from axial movement by said reaction member, means including a piston rod connecting each of said pistons to said thrust member, a universal joint for rotating said thrust member in unison with said cylinder member, valve means for controlling the flow of liquid to and from said cylinders, a hydraulic thrust bearing rotatable with said thrust member and arranged between said thrust member and said reaction member in contact therewith, said bearing having in the face thereof in contact with said reaction member a plurality of pressure chambers each of which is arranged in the same radial plane as one of said cylinders, channel means extending through said bearing, thrust member, connecting means and pistons for connecting each of said chambers to the cylinder in the same radial plane to permit liquid to flow from said cylinders into said recesses and to maintain in each recess the same pressure that prevails in the cylinder in the same radial plane to thereby cause liquid to seep from said recesses and form a lubricating film between said bearing and said reaction member, and means arranged between said bearing and said reaction member for limiting the area of lubricating film into which pressure can extend from said recesses to such an area that the force exerted by the liquid in each recess and in the film surrounding that recess and extending through an angular distance equal to the angular distance between adjacent recesses is nearly equal to but less than the force exerted by the liquid in the cylinder in the same radial plane upon the piston in that cylinder.

3. An axial pump, comprising a casing, a rotatable cylinder member arranged within said casing and having a plurality of pistons and cylinders arranged therein parallel to each other and in a circular row, valve means engaging said cylinder member for controlling the flow of liquid to and from said cylinders, means for rotating said cylinder member, a non-rotatable reaction member restrained from axial movement by said casing and inclined to the axis of said cylinder member, a rotatable thrust member engaging and restrained from axial movement by said reaction member, means including a piston rod connecting each of said pistons to said thrust member, and an annular universal joint arranged radially outward from said piston rods and including means pivotally connecting one part of said joint to said thrust member at diametrically opposed points radially outward from said piston rods and means arranged in axial alinement with each of said connecting means and pivotally connecting another part of said joint to said cylinder member.

4. A pump according to claim 3 in which said universal joint includes a first ring pivotally connected to said cylinder member at diametrically opposite points, a second ring pivotally connected to said thrust member at diametrically opposite points in the same radial plane as said first mentioned points, and means for pivotally connecting said rings to each other at diametrically opposite points spaced 90° from said first mentioned points.

5. A pump according to claim 3 in which said cylinder member has two axial bores formed therein diametrically opposite each other, a plunger is arranged in each of said bores, and said universal joint includes a first ring pivotally connected at diametrically opposite points to said plungers, a second ring pivotally connected to said thrust member at diametrically opposite points in the same radial plane as said first mentioned points, and means for pivotally connecting said rings to each other at diametrically opposite points spaced 90° from said first mentioned points.

6. An axial pump, comprising a casing, a rotatable cylinder member arranged within said casing and having a plurality of pistons and cylinders arranged therein parallel to each other and in a circular row, valve means engaging said cylinder member for controlling the flow of liquid to and from said cylinders, means for rotating said cylinder member, a non-rotatable reaction member restrained from axial movement by said casing and inclined to the axis of said cylinder member, a radial thrust bearing carried by said reaction member, a thrust member mounted upon said bearing and restrained from axial movement by said reaction member, a piston rod articulated at one end to each of said pistons, a joint connecting each of said rods to said thrust member, and an annular universal joint connecting said thrust member to said cylinder member and extending around said thrust member radially outward of said joints, said bearing being arranged substantially in the center of the plane of said joints so that the resultant of the radial components of the pumping forces lands directly upon said bearing at right angles to the axis thereof.

7. A pump according to claim 6 in which said universal joint includes a first ring pivotally connected to said cylinder member at diametrically opposite points, a second ring pivotally connected to said thrust member at diametrically opposite points in the same radial plane as said first mentioned points and radially outward of said connecting rods, and means for pivotally connecting said rings to each other at diametrically opposite points spaced 90° from said first mentioned points.

8. A pump according to claim 6 in which said cylinder member has two axial bores formed therein diametrically opposite each other, a plunger is arranged in each of said bores, and said universal joint includes a first ring pivotally connected at diametrically opposite points to said plungers, a second ring pivotally connected to said thrust member at diametrically opposite points in the same radial plane as said first mentioned points, and means for pivotally connecting said rings to each other at diametrically opposite points spaced 90° from said first mentioned points.

9. An axial type pump, comprising a casing, a rotatable cylinder member arranged within said casing, a plurality of pistons and cylinders arranged in said cylinder member parallel to each other and in a circular row, valve means for controlling the flow of liquid to and from said cylinders, means for rotating said cylinder member, two trunnions carried by said casing at opposite sides thereof, a reaction member pivoted upon said trunnions and having a central horn, a radial thrust bearing carried by said horn, a thrust member mounted upon said bearing and restrained from axial movement by said reaction member, a piston rod articulated at one end to each of said pistons, a joint connecting each of said rods to said thrust member, and an annular universal joint connecting said thrust member to said cylinder member and extending around said thrust member radially outward of said joints, said bearing being arranged substantially in the center of the plane of said joints so that the resultant of the radial components of the pumping forces lands directly upon said bearing at right angles to the axis thereof.

10. A pump according to claim 9 in which said universal joint includes a first ring pivotally connected to said cylinder member at diametrically opposite points, a second ring pivotally connected to said thrust member at diametrically opposite points in the same radial plane as said first mentioned points and radially outward of said connecting rods, and means for pivotally connecting said rings to each other at diametrically opposite points spaced 90° from said first mentioned points.

11. A pump according to claim 9 in which said cylinder member has two axial bores formed therein diametrically opposite each other, a plunger is arranged in each of said bores, and said universal joint includes a first ring pivotally connected at diametrically opposite points to said plungers, a second ring pivotally connected to said thrust member at diametrically opposite points in the same radial plane as said first mentioned points, and means for pivotally connecting said rings to each other at diametrically opposite points spaced 90° from said first mentioned points.

12. An axial type pump, comprising a casing, a rotatable cylinder member arranged within said casing, a plurality of pistons and cylinders arranged in said cylinder member parallel to each other and in the circular row, valve means for controlling the flow of liquid to and from said cylinders, two trunnions carried by said casing at opposite sides thereof, a reaction member pivoted upon said trunnions and having a central horn, a radial thrust bearing carried by said horn, a thrust member mounted upon said bearing and restrained from axial movement by said reaction member, means including a piston rod for connecting each of said pistons to said thrust member, means for rotating said cylinder member, an annular universal joint connecting said thrust member to said cylinder member and extending around said thrust member radially outward of said piston connecting means, a hydraulic thrust bearing rotatable with said thrust member and arranged between said thrust member and said reaction member in contact therewith, said hydraulic bearing having in the face thereof in contact with said reaction member a plurality of pressure chambers each of which is arranged in the same radial plane as one of said cylinders, and channel means connecting each of said chambers to the cylinder in the same radial plane.

13. A pump according to claim 12 in which said universal joint includes a first ring pivotally connected to said cylinder member at diametrically opposite points, a second ring pivotally connected to said thrust member at diametrically opposite points in the same radial plane as said first mentioned points and radially outward of said connecting rods, and means for pivotally connecting said rings to each other at diametrically opposite points spaced 90° from said first mentioned points.

14. An axial type pump, comprising a casing, a rotatable cylinder member arranged within said casing, a plurality of pistons and cylinders arranged in said cylinder member parallel to each other and in a circular row, valve means for controlling the flow of liquid to and from said cylinders, two trunnions carried by said casing at opposite sides thereof, a reaction member pivoted upon said trunnions and having a central horn, a radial thrust bearing carried by said horn, a thrust member mounted upon said bearing and restrained from axial movement by said reaction member, means including a piston rod for connecting each of said pistons to said thrust member, means for rotating said cylinder member, an annular universal joint connecting said thrust member to said cylinder member and extending around said thrust member radially outward of said piston connecting means, a hydraulic thrust bearing rotatable with said thrust member and arranged between said thrust member and said reaction member in contact therewith, said hydraulic bearing having in the face thereof in contact with said reaction member a plurality of pressure chambers each of which is arranged in the same radial plane as one of said cylinders, and channel means extending through said hydraulic bearing, thrust member, connecting means and pistons for connecting each of said chambers to the cylinder in the same radial plane.

15. An axial type pump, comprising a casing, a rotatable cylinder member arranged within said casing, a plurality of pistons and cylinders arranged in said cylinder member parallel to each other and in a circular row, a non-rotatable reaction member restrained from axial movement by said casing and inclined to the axis of said cylinder member, a rotatable thrust member restrained from axial movement by said reaction member, means including a piston rod for connecting each of said pistons to said thrust member, said cylinder member having an axial bore and a shallow counterbore at the end of said bore, a drive shaft rotatably supported by said casing and extending through said bore, means for transmitting rotary motion from said shaft to said cylinder member, a snap ring arranged in said counterbore, a keeper ring for retaining said snap ring in said counterbore, and means for holding said snap ring substantially concentric with said bore, said shaft having at its inner end a tapered portion to expand said snap ring as said shaft is moved through said bore and having adjacent to said tapered portion a peripheral groove to receive said snap ring.

References Cited in the file of this patent

UNITED STATES PATENTS

| 2,141,935 | Rose | Dec. 27, 1938 |
| 2,241,701 | Doe | May 13, 1941 |
| 2,577,242 | Grad | Dec. 4, 1951 |

FOREIGN PATENTS

| 539,637 | Great Britain | Sept. 18, 1941 |